(12) United States Patent
Nobis et al.

(10) Patent No.: US 12,404,061 B2
(45) Date of Patent: Sep. 2, 2025

(54) PROTECTIVE SLIDE FOR A WORK MACHINE

(71) Applicant: MULTIVAC SEPP HAGGENMÜLLER SE & CO. KG, Wolfertschwenden (DE)

(72) Inventors: Nick Nobis, Kempten (DE); Frank Steigerwald, Memmingen (DE); Dominik Patz, Kempten (DE)

(73) Assignee: Multivac Sepp Haggenmüller Se & Co. KG, Wolfertschwenden (DE)

( * ) Notice: Subject to any disclaimer, the term of this patent is extended or adjusted under 35 U.S.C. 154(b) by 58 days.

(21) Appl. No.: 18/435,049

(22) Filed: Feb. 7, 2024

(65) Prior Publication Data
US 2024/0262555 A1 Aug. 8, 2024

(30) Foreign Application Priority Data
Feb. 7, 2023 (DE) .......................... 102023102890.1

(51) Int. Cl.
*B65B 57/00* (2006.01)
*B65B 57/04* (2006.01)

(52) U.S. Cl.
CPC ............ *B65B 57/005* (2013.01); *B65B 57/04* (2013.01)

(58) Field of Classification Search
CPC . B65B 57/00–18; B65B 31/024; B65B 50/04; F16P 1/005
See application file for complete search history.

(56) References Cited

U.S. PATENT DOCUMENTS 3,186,256 A * 6/1965 Reznick .................... F16P 3/04
72/1
3,213,992 A * 10/1965 Gustafson ............... F16P 3/005
192/134

(Continued)

FOREIGN PATENT DOCUMENTS

DE 2516293 A1 10/1976
DE 3925796 A1 2/1991

(Continued)

OTHER PUBLICATIONS

Search Report re App. No. DE 102023102890.1 dated Oct. 2, 2023; Applicant: MULTIVAC Sepp Haggenmuller Se & Co. KG (with English machine translation) (8 pages).

(Continued)

*Primary Examiner* — Dariush Seif
(74) *Attorney, Agent, or Firm* — Brooks Kushman P.C.

(57) ABSTRACT

A protective slide assembly for a work machine for processing packaging material includes an assembly element for connecting the protective slide assembly to the work machine, a protective element arranged to be movable relative to the assembly element, a first sensor element, and a second sensor element fixedly arranged at the assembly element. The protective element can be moved relative to the assembly element between a release position and a protection position, and the first sensor element and the second sensor element are configured to come into contact in the protection position of the protective element and to output a signal that is indicative of the contact. The first sensor element is arranged such that it can be moved along with the protective element and an amplitude of motion of the first sensor element is greater than an amplitude of motion of the protective element.

19 Claims, 6 Drawing Sheets

(56) References Cited

U.S. PATENT DOCUMENTS

| | | | | |
|---|---|---|---|---|
| 3,987,881 A * | 10/1976 | Perkins | ............... | F16P 3/08 74/612 |
| 4,060,160 A * | 11/1977 | Lieber | ............... | H01H 3/16 200/61.42 |
| 4,179,987 A * | 12/1979 | Dohm, Jr. | ............... | F16P 3/10 100/345 |
| 4,307,798 A * | 12/1981 | Watanabe | ............... | F16P 3/08 74/613 |
| 4,527,684 A * | 7/1985 | Eggeman | ............... | F16P 3/16 192/130 |
| 4,620,408 A * | 11/1986 | Parnes | ............... | B65B 11/025 53/77 |
| RE34,396 E * | 10/1993 | Wollenhaupt | ............... | H01H 27/007 335/170 |
| 5,323,513 A * | 6/1994 | Binder | ............... | F16P 1/02 241/37.5 |
| 5,400,677 A * | 3/1995 | Toye | ............... | B21D 55/00 74/615 |
| 5,560,466 A * | 10/1996 | Folk | ............... | F16P 3/005 74/615 |
| 5,719,363 A * | 2/1998 | Handler | ............... | H01H 71/126 200/50.02 |
| 5,819,645 A * | 10/1998 | Sutton | ............... | B30B 9/3007 361/114 |
| 5,913,795 A * | 6/1999 | Schubert | ............... | B65B 59/04 493/477 |
| 6,131,429 A * | 10/2000 | Ward | ............... | F16P 3/08 72/1 |
| 6,148,985 A * | 11/2000 | Wagner | ............... | B30B 1/08 192/133 |
| 6,234,291 B1 * | 5/2001 | Koenders | ............... | F16P 3/16 192/133 |
| 6,325,195 B1 * | 12/2001 | Doherty | ............... | F16P 3/08 52/DIG. 14 |
| 10,240,844 B1 * | 3/2019 | Metzger | ............... | F25C 5/24 |
| 2003/0052489 A1 * | 3/2003 | Schwesig | ............... | F16P 3/12 292/144 |
| 2015/0275551 A1 * | 10/2015 | Rink | ............... | H01H 27/007 70/263 |
| 2016/0031580 A1 * | 2/2016 | Dugat | ............... | B65B 57/02 83/13 |
| 2017/0038005 A1 * | 2/2017 | Kraus | ............... | E05B 65/06 |
| 2018/0187834 A1 * | 7/2018 | Phay | ............... | F16P 3/10 |
| 2020/0182403 A1 * | 6/2020 | Plariza | ............... | F16P 3/08 |
| 2021/0170601 A1 * | 6/2021 | Saito | ............... | B65G 1/0435 |
| 2021/0189774 A1 * | 6/2021 | Asano | ............... | E05B 47/0046 |
| 2022/0153465 A1 * | 5/2022 | Ralph | ............... | B65B 43/48 |
| 2022/0406535 A1 * | 12/2022 | Hoshiba | ............... | G01V 8/10 |
| 2024/0262555 A1 * | 8/2024 | Nobis | ............... | F16P 3/08 |
| 2025/0164070 A1 * | 5/2025 | Pizzato | ............... | F16P 3/08 |

FOREIGN PATENT DOCUMENTS

| | | |
|---|---|---|
| DE | 102008053665 A1 | 5/2010 |
| DE | 102009018215 A1 | 11/2010 |
| DE | 102019214962 A1 | 4/2021 |
| DE | 102021104083 A1 | 8/2022 |
| EP | 2792601 A1 | 10/2014 |
| JP | S5759000 A | 4/1982 |

OTHER PUBLICATIONS

European Search Report re EP 24155286.8 dated Jul. 8, 2024 (with English machine translation) (10 pages).

* cited by examiner

PROTECTIVE SLIDE FOR A WORK MACHINE

CROSS-REFERENCE TO RELATED APPLICATIONS

This application claims foreign priority benefits under 35 U.S.C. § 119(a)-(d) to German patent application number DE 102023102890.1 filed Feb. 7, 2023, which is incorporated by reference in its entirety.

TECHNICAL FIELD

The present disclosure relates to a protective slide or protective slide assembly for a work machine in the packaging industry, as well as to a work machine for processing packaging material in the packaging industry, and to a method for processing packaging material with a work machine in the packaging industry.

BACKGROUND

A large number of work machines are known in the packaging industry. This includes, for example, machines that can process packaging material (such as plastic material). For example, packaging trays can be created in the film from a film web or generally from a film body using a deep-drawing machine, product (e.g., sausage products or cheese) can be placed in the packaging trays in a filling machine, and the filled packaging trays can be sealed with a top film by a sealing station.

For this purpose, known packaging machines not only comprise transport devices for the packaging material to be processed but also often components (for example, upper tool and lower tool of a sealing station) that can be moved towards and away from each other for processing the packaging material introduced between the two. Such components and their motion relative to one another pose a possible risk of injury to an operator if the operator can reach into the working space of the machine in which the packaging material is processed.

Various options are known from prior art for avoiding or preventing the operator's ability to reach into the work space.

For example, DE 10 2021 104083 A1 and DE 39 25 796 A1 show devices that can block an operator from reaching into a passage of the work machine through which packaging material can be fed to or removed from the work space. These devices are configured as protective slides and are typically positioned in front of the passages of the work machine in such a way that an operator cannot reach into the work space during a work process. At the same time, it is known to use suitable sensors for determining whether the protective slide is in the desired position prior to the operation being carried out.

In order to meet safety requirements, it must be ensured that an operator does not accidentally reach into the work space even though the protective slide is positioned in the protection position. This requires reliable detection of this protection position and also of small deviations of the actual position of the protective slide from this protection position, which requires complex sensor units. This means that the overall installation space required for the protective slide is large, which can have an impact on the required installation space for a packaging system.

SUMMARY

Starting out from known prior art, a technical object to be satisfied is therefore to specify a protective slide or protective slide assembly for a work machine in the packaging industry and a method for processing packaging material with a work machine in the packaging industry which ensure reliable protection of an operator from accidentally reaching into a working space of a work machine and at the same time to achieve a reduction in installation size.

This object is satisfied disclosure by a protective slide or protective slide assembly for a work machine in the packaging industry according to the disclosure, a work machine in the packaging industry according to the disclosure, as well as a method for processing packaging material with a work machine in the packaging industry according to the disclosure.

The protective slide or protective slide assembly according to the disclosure for a work machine for processing packaging material comprises an assembly element for connecting the protective slide assembly to a work machine, a protective element arranged to be movable relative to the assembly element, a first sensor element and a second sensor element fixedly arranged at the assembly element, where the protective element can be moved relative to the assembly element between a release position and a protection position and where the first sensor element and the second sensor element are configured to come into contact in the protection position of the protective element and to output a signal that is indicative of the contact, where the first sensor element is arranged such that it can be moved along with the protective element and an amplitude of motion of the first sensor element is greater than an amplitude of motion of the protective element.

The contact can be either a physical contact between the first sensor element and the second sensor element or a contact imparted by way of acting forces, for example, electromagnetic forces. For example, when a threshold value of a magnetic force exerted upon the second sensor element by the first sensor element is exceeded, then contact with the first sensor element can be detected by the second sensor element and a corresponding signal that is indicative of this contact can be output.

The term amplitude of motion is to be understood to mean a distance traveled between a first point and a second point. The fact that the amplitude of motion of the first sensor element is greater than the amplitude of motion of the protective element is presently not restricted such that the entire distance traveled by the first sensor element, when the protective element moves from the first position to the second position, is greater than the distance traveled by the protective element between the first position and the second position. According to the disclosure, it is sufficient to have the amplitude of motion of the first sensor element be greater, at least between a first point that the protective element assumes and a second point that coincides with the protection position, than the distance traveled by the protective element between the first point and the second point. As a result, a comparatively small stroke or general distance that the protective element travels is converted into a larger distance traveled by the first sensor element.

This means that even small changes in the position of the protective element, for example, relative to the protection position, have a comparatively large effect on the position of the first sensor element so that the accuracy with which it is determined whether the protective element is disposed in the protection position can be precisely determined by the effect of the contact or its absence. This increases the protection of an operator and at the same time reduces the required installation space and the complexity of the sensors.

It is provided in one embodiment that the first sensor element and the second sensor element together form a magnetic circuit, where the second sensor element optionally comprises an actuatable magnetic switch and the first sensor element comprises a magnet for actuating the magnetic switch. The first sensor element and the second sensor element can then realize the circuit together, where one of the sensor elements comprises the actuatable magnetic switch and the other sensor element comprises the magnet. Magnetic circuits can be operated reliably over many work cycles so that the protection of the operator can be ensured even over a long period of operation.

It can be provided that the amplitude of motion of the first sensor element in a first motion section that comprises the release position is smaller than or equal to the amplitude of motion of the protective element in the first motion section and that the amplitude of motion of the first sensor element in a second motion section that comprises the protection position is greater than the amplitude of motion of the protective element in the second motion section. In the first motion section, the first sensor element can be moved in particular along with the protective element so that the distance of any random point of the first sensor element to any random point of the protective element is constant during the motion. In the second motion section, the first sensor element is moved with a larger amplitude of motion as compared to the amplitude of motion of the protective element so that at least parts of the first sensor element experience a motion relative to the protective element. Since the increase in the amplitude of motion of the first sensor element, which is advantageous for the protective effect, is only relevant in the region of the protection position of the protective element for determining it correctly (by actuating the second sensor element), this embodiment results in a structural simplification, in particular in reduced space requirement for the motion of the first sensor element.

It is provided in one embodiment that the first sensor element is arranged at a lever which is mounted to be rotatable about an axis, where the axis divides the lever into a first lever arm and a second lever arm, where the second lever arm is shorter than the first lever arm and the first sensor element is arranged at the first lever arm, where the protective slide or protective slide assembly comprises a stop against which the second lever arm can abut when the protective element moves in the direction of the protection position so that, with a rotation of the lever about the axis, the first sensor element can be moved in the direction of the second sensor element. This mechanical configuration for realizing the amplitudes of motion of different sizes of the first sensor element and of the protective element is reliable and exhibits little wear so that reliably determining the protection position of the protective element can be achieved even over a long period of operation.

It can be provided that the first lever arm has a greater mass than the second lever arm. This embodiment is particularly advantageous if the protective element occupies a lower height in the release position than in the protection position, but is not restricted thereto. With the different masses of the first lever arm and the second lever arm, the first sensor element can be reliably made to assume a desired initial position due to the torque acting upon the lever so that contacting the second sensor element can preferably be caused only by a motion of the protective element to the protection position which increases the reliability when determining whether the protection position has been assumed by the protective element.

In one embodiment, the protective slide or protective slide assembly comprises a return element which is arranged such that the return element moves the first sensor element away from the second sensor element when the protective element moves from the protection position to the release position. This can prevent the first sensor element from unintentionally remaining close to the second sensor element or in contact with the second sensor element.

In one embodiment, the protective element and the amplitude of motion of the protective element define a region and the assembly element, the first sensor element, and the second sensor element are arranged outside the region. The region is presently to be understood to be a space occupied overall by the protective element during its amplitude of motion and can be represented, for example, as the resulting space that is obtained when a surface completely surrounding the protective element moves along the amplitude of motion. In this embodiment, the first sensor element and the second sensor element are not arranged in a region through which the protective element passes, which allows for a more compact structure and, for example, enables the first sensor element and the second sensor element to be arranged below this region (for example, when the protective element is moved vertically). This reduces the space required for the protective slide or protective slide assembly.

The work machine according to the disclosure for processing packaging material comprises a feed opening for feeding packaging material, a work space for processing packaging material, a discharge opening for discharging processed packaging material from the work space, and a protective slide or protective slide assembly, for example, according to one of the previous embodiments, in the region of the feed opening and/or in the region of the discharge opening, where the protective slide or protective slide assembly is arranged such that the protective element in the protection position blocks an operator from reaching into the feed opening and/or the discharge opening. Packaging material can be processed safely with this work machine.

It can be provided that the protective element in the protection position enables packaging material to be transported into the feed opening and/or processed packaging material to be transported out of the discharge opening. The packaging material can be, for example, a film web or film cuts or connected or separated packaging trays. While it is also possible to continue feeding the packaging material in the protection position of the protective element, an operator is still prevented from reaching into the work space. The throughput of the work machine can be increased while maintaining the same level of operator safety.

The work machine can comprise a sealing station, a deep-drawing machine, a loading machine, an inspection device and/or a disinfection device. Using the protective slide or protective slide assembly is advantageous for these machines because a continuous supply of packaging material is given.

According to the disclosure, a method for processing packaging material with a work machine is provided, where the work machine comprises a feed opening for feeding packaging material, a work space, a discharge opening for discharging processed packaging material from the work space and, a protective slide or protective slide assembly, where the protective slide assembly is connected to the work machine by way of an assembly element of the protective slide assembly and comprises a protective element arranged to be movable relative to the assembly element, a first sensor element and a second sensor element fixedly arranged at the assembly element, where the protective element can be moved relative to the assembly element between a release position and a protection position and where the first sensor element and the second sensor element come into contact in the protection position of the protective element and output a signal that is indicative of the contact, where the first sensor element is arranged such that it is moved along with the protective element and an amplitude of motion of the first sensor element is greater than a amplitude of motion of the protective element, where the method comprises releasing a work step of the work machine by a control unit of the work machine based on receiving the signal that is indicative of the contact This method allows for packaging material to be processed safely even when an operator is present.

It can be provided that the amplitude of motion of the first sensor element in a first motion section that comprises the release position is smaller than or equal to the amplitude of motion of the protective element in the first motion section and that the amplitude of motion of the first sensor element in a second motion section that comprises the protection position is greater than the amplitude of motion of the protective element in the second motion section. This results in a compact design of the work machine and in particular of the protective slide or protective slide assembly, which reduces the space required.

In an embodiment, the first sensor element is arranged at a lever which is mounted to be rotatable about an axis, where the axis divides the lever into a first lever arm and a second lever arm, where the second lever arm is shorter than the first lever arm and the first sensor element is arranged at the first lever arm, where the protective slide or protective slide assembly comprises a stop against which the second lever arm abuts when the protective element moves in the direction of the protection position and, with a rotation of the lever about the axis, the first sensor element is moved in the direction of the second sensor element. This mechanical configuration allows for the position of the protective element in the protection position to be reliably determined.

It can be provided that the first lever arm has a greater mass than the second lever arm. This achieves a reliable return action of the first sensor element since the lever is forced into an initial position due to torques acting.

In an embodiment, the protective slide or protective slide assembly comprises a return element and the first sensor element is moved away from the second sensor element by the return element when the protective element moves from the protection position to the release position. This can ensure reliable detection of a motion of the protective element away from the protection position.

The protective element and the amplitude of motion of the protective element can define a region and the assembly element, the first sensor element, and the second sensor element can be arranged outside the region. This embodiment enables a compact design.

It can be provided that the first sensor element and the second sensor element together form a magnetic circuit, where the second sensor element optionally comprises an actuatable magnetic switch and the first sensor element comprises a magnet for actuating the magnetic switch. With this embodiment, long-term operation is also possible while still protecting the operator from injuries.

Each of the preceding embodiments can be combined with each of the further embodiments described within the meaning of the present disclosure.

DETAILED DESCRIPTION

Figure 1:
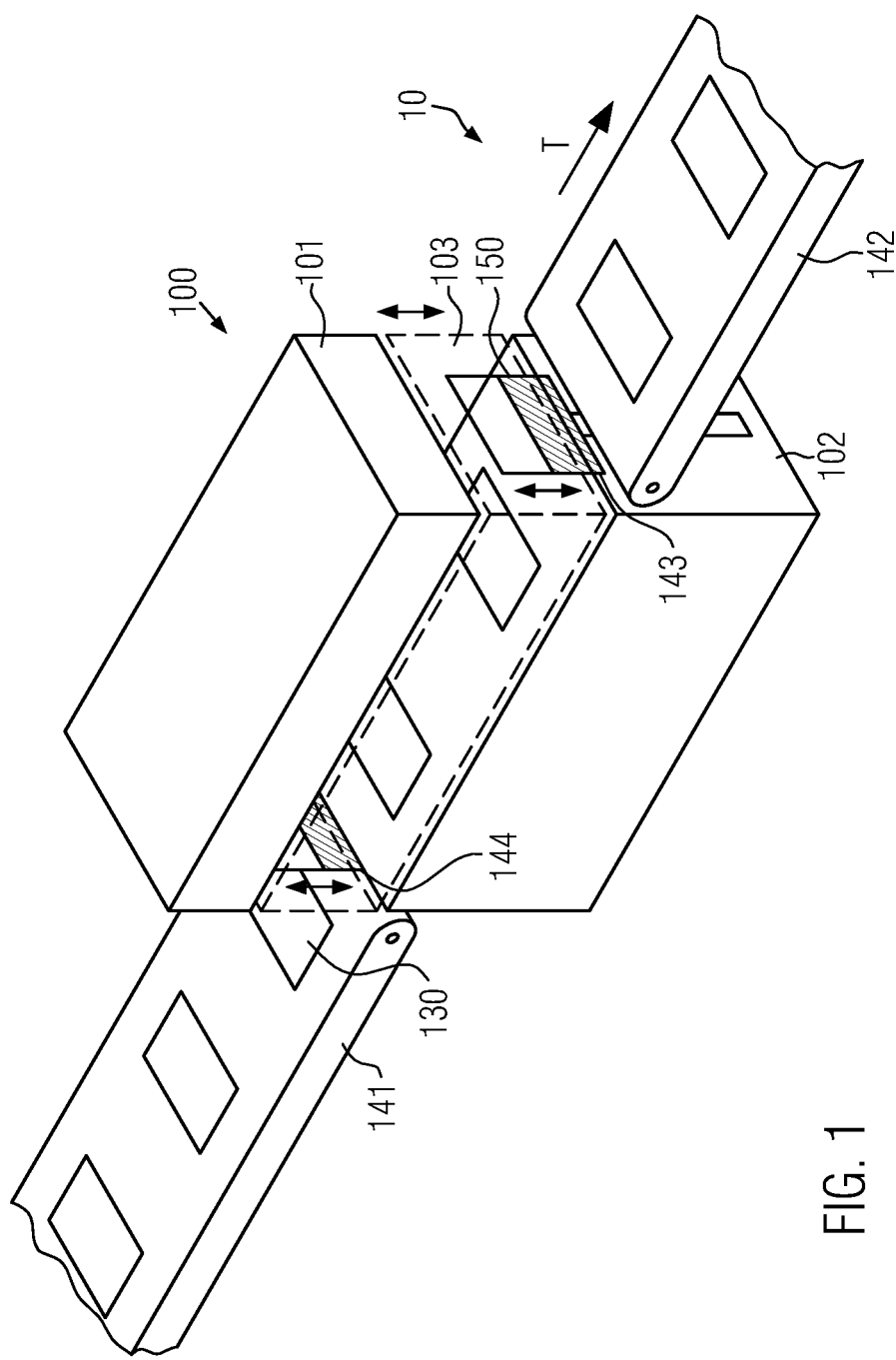
FIG. 1 shows a schematic view of a work machine with a protective slide or protective slide assembly according to an embodiment.

FIG. 1 shows a work machine 100 as part of a packaging machine 10. The work machine is intended to process packaging material 130 which can be present, for example, in the form of one or more continuous film webs or connected or separated packaging trays (already filled or unfilled). The disclosure is not restricted in this regard and with regard to the configuration of the work machine. In the embodiment presently shown, work machine 100 is configured, for example, as a sealing station.

Sealing stations are basically known from prior art and typically comprise an upper tool 101 and a lower tool 102 and a work space 103 formed between them in which the processing of packaging trays 130 that are provided with product takes place. Upper tool 101 and lower tool 102 can be moved towards one another according to the double arrow shown so that the filled packaging trays and a sealing film applied to the packaging trays in the sealing station can be made to contact one another and connect to one another by the action of heat in order to seal the packages.

For this purpose, work machine 100 typically comprises a feed opening 144 and a discharge opening 143 which, as presently shown, can be arranged on oppositely disposed sides of the work machine, where feed opening 144 is arranged in direction of transport T of the packaging material 130 in front of discharge opening 143, and feed opening 144 and discharge opening 143 can define work space 103. The feed opening and discharge opening 144 and 143 can be formed, for example, as openings in a protective wall or a panel of work machine 100.

The work machine is presently shown by way of example between a transport device 141 which can supply packaging material 130 to work machine 100 and a transport device 142 which can remove processed packaging material from work machine 100. The configuration of transport devices 141 and 142 is not restricted. They can be, for example, conveyor belts and/or grippers, where transport devices 141 and 142 can be configured according to practicality and in particular do not have to be configured identically.

While FIG. 1 shows an example of a work machine 100 according to embodiments in the form of a sealing station, other embodiments of the work machine are also possible. In particular, the work machine can be configured as a sealing station or as a deep-drawing machine or a loading machine or an inspection device or a disinfection device. A packaging system comprising one or more of these work machines, for example, one behind the other in the direction of transport of packaging material is also conceivable.

As openings in work space 103, feed opening 144 and discharge opening 143 fundamentally represent a risk of injury since an operator of the work machine could reach into work space 103 while the work machine is in operation. At the same time, the feed opening and the discharge opening must be large enough to ensure any necessary repairs or the removal of packaging material should the machine malfunction.

In order to minimize the risk of injury to an operator during operation of work machine 100 as much as possible, a protective slide 150, presently shown schematically, is provided according to the disclosure at least in front of feed opening 144 and/or discharge opening 143 and is arranged and configured to reduce or close the feed opening and/or the discharge opening to the extent that an operator cannot reach into work space 103 when work machine 100 is in operation. In the case of a machine that works in cycles, this can comprise that the working step of the work machine (in the example of FIG. 1, for example, moving upper tool 101 and lower tool 102 towards each other) can only be carried out if the protective slide or a protective element of the protective slide has been moved to a protection position which prevents an operator from reaching into work space 103 as much as possible in that the remaining opening is so small that, for example, no finger or arm can be extended therethrough into work space 103.

Figure 2:
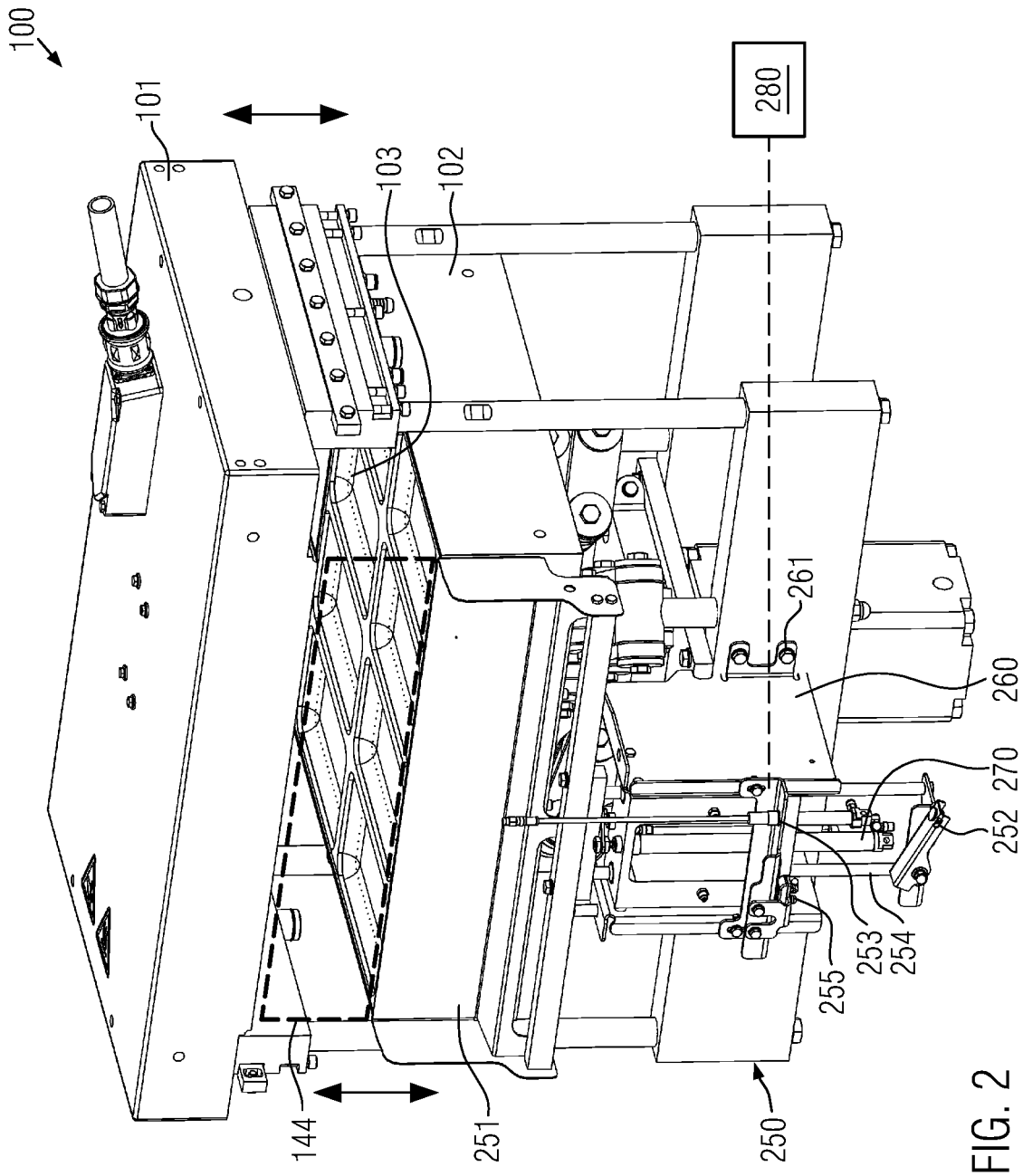
FIG. 2 shows a feed opening with a protective slide according to an embodiment.

FIG. 2 shows a protective slide or protective slide assembly 250 according to an embodiment in relation to work machine 100. The work machine in FIG. 2 is again shown by way of example as a sealing station with an upper tool 101 and a lower tool 102 which are arranged to be movable relative to one another. In this embodiment, protective slide assembly 250 comprises an assembly element 260 (e.g., bracket or other support structure) which can be connected by way of one or more suitable connection elements, for example, screws 261, for example, to stationary lower tool 102 or another preferably stationary part (for example a panel in which feed opening 144 or discharge opening 143 is formed in) of work machine 100. In this sense, assembly element 260 has the function of a stationary frame, relative to which protective element or slide 251 (e.g., protective panel, door, etc.) is arranged to be movable in order to be moved according to the double arrow direction shown and to close or open feed opening 144 (or discharge opening 143). Where the position of protective slide 251 in the region of feed opening 144 is geared toward hereafter, it is to be understood that all embodiments of the protective slide and each of its parts as well as their function are also applicable to positioning the protective slide in front of discharge opening 143 or for one respective protective slide in front of each of these openings.

If protective slide 251 is moved upwardly in the embodiment presently shown, feed opening 144 becomes smaller. If it is moved downwardly, the feed opening is enlarged. Positioning the protective slide in front of feed opening 144 in such a way that an operator can no longer reach into the work space is referred to as the protection position. Positioning the protective slide in front of the feed opening, which enables an operator to reach in, is referred to as the release position.

It can be provided that feeding packaging material (not shown in FIG. 2) into work space 103 of the work machine is possible both in the release position of protective slide 251 in which work space 103 is accessible through feed opening 144 as well as in the protection position in which work space 103 is not accessible to the operator through feed opening 144. This is particularly advantageous with a continuous supply of packaging material. In alternative embodiments, in which, for example, separate pieces of packaging material are fed to work space 103 during cyclical operation of the work machine, it can be provided that no further packaging material is fed to work space 103 through the feed opening during a work step. It can be provided in this embodiment that protective slide 251 closes the feed opening entirely so that no supply of packaging material (nor analogous discharge of packaging material from the discharge opening) is possible.

To move protective element 251 relative to assembly element 260 and relative to feed opening 144, a drive element 270, for example, in the form of a pneumatic cylinder, can be provided which is operatively connected to protective element 251 and can set it in motion. For example, a servo drive or an actuating drive can also be used instead of a pneumatic cylinder.

According to the disclosure, the protective slide assembly 250 further comprises a first sensor element 252 which is connected to protective element 251 such that it can be moved at least in part along with protective element 251. For this purpose, for example, a connection element 254, such as in the form of a suspension (e.g., a rod, bar, bracket, or any other suitable support) for first sensor element 252, can be provided at which first sensor element 252 is arranged and which is firmly connected to protective element 251 so that connection element 254 follows the motion of protective element 251.

Furthermore, protective slide assembly 250 comprises a second sensor element 253. Second sensor element 253 is arranged in a stationary manner relative to assembly element 260 and can in particular be attached to assembly element 260.

It is provided according to the disclosure that the first sensor element 252 and the second sensor element 253 can interact in such a way that, upon (for example touching or physical) contact, they output a signal that is indicative of this contact. The arrangement of first sensor element 252 relative to protective element 251 around the arrangement of second sensor element 253 is configured such that the first sensor element and the second sensor element are in touching contact with each other when protective element 251 is arranged in the protection position, in all other positions of the protective element, however, the first sensor element and the second sensor element exhibit no (touching or physical) contact.

If the first sensor element 252 and the second sensor element 253 are in touching contact with one another, then they can output a signal that is indicative of the touching contact and can be transmitted to a control unit 280 presently shown schematically. Control unit 280 can be, for example, a computer with a memory and a processor unit that is disposed of suitable programming to receive and, if necessary, process the signal that is indicative of the contact. In that regard, as one skilled in the art would understand, the control unit 280, as well an any other unit, machine, apparatus, element, sensor (e.g., first sensor element 252 and second sensor element 253), device, component, system, subsystem, arrangement, or the like described herein may individually, collectively, or in any combination comprise appropriate circuitry, such as one or more appropriately programmed processors (e.g. one or more microprocessors including central processing units (CPU)) and associated memory, which may include stored operating system software and/or application software executable by the processor(s) for controlling operation thereof and/or for performing the particular algorithms represented by the various functions and/or operations described herein, including interaction and/or cooperation between any such controller, unit, machine, apparatus, element, sensor, device, component, system, subsystem, arrangement, or the like. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Preferably, control unit 280 can release or block the operation of the work machine and in particular the execution of a work step of the work machine (for example, the sealing of packages or moving upper tool 101 and lower tool 102 towards each other) based on the signal received.

The control unit 280 preferably only releases the work step when the signal that is indicative of the contact has been received, since protective element 251 is then disposed in the protection position, so that the operator reaching into the work space 103 does not occur. If such a signal is not received, then the control unit 280 can block or disable the work step so that the risk of injury to the operator is minimized.

Since protective element 251 is typically moved to and fro between the protection position and the release position during continuous operation of the work machine, it can be provided that the first sensor element 252 and/or the second sensor element 253 are configured such that they output a signal at regular time intervals (e.g., every 2 ms to 50 ms, preferably every 2 ms to 5 ms) that is indicative of whether or not contact is given between the first sensor element and the second sensor element. After evaluating this signal, the control unit 280 can then determine (almost) in real time and substantially continuously whether a work step can be released or remains blocked. It can then be provided that, when the control unit 280 receives a signal that is indicative of there being no contact between the first sensor element 252 and the second sensor element 253, the control unit 280 blocks the work step and only releases it again when the control unit 280 receives a signal that is indicative of the contact between the first sensor element 252 and the second sensor element 253.

In one embodiment, first sensor element 252 and second sensor element 253 can together form a magnetic circuit. One of the sensor elements there comprises a magnet and the other sensor element comprises a magnetic switch which can be actuated by the magnet so that a signal can be generated which indicates the actuation of the magnetic switch by the magnet. The magnetic switch is preferably implemented as or as part of second sensor element 253 and the magnet is or is part of first sensor element 252. Since the magnetic switch must have a power supply and possibly a physical data connection to control unit 280, this embodiment has the advantage that cable routing from and/or to the magnetic switch does not have to be moved during operation of the machine, which reduces the susceptibility to errors.

According to the disclosure, it is provided that an amplitude of motion of first sensor element 252 is greater than the amplitude of motion of protective element 251. This is to be understood to mean that, when protective element 251 moves from a first point to a second point, the protective element travels a distance of length L. However, first sensor element 252, which by way of connection element 254 substantially follows the motion of protective element 251, travels a longer distance. This does not have to apply generally to the entire motion of first sensor element 252 when following the motion of protective element 251 from the release position to the protection position, but it is provided according to the disclosure that this occurs at least for a portion of the entire motion of the protective element from the release position to the protection position.

The motion of protective element 251 from the release position to the protection position can be divided into a first motion section and a second motion section. The first motion section comprises the release position itself and a further point on the path of the protective element 251 from the release position to the protection position, where the further point does not correspond to the protection position of protective element 251. In this motion section, the amplitude of motion of protective element 251 can be identical to the amplitude of motion of first sensor element 252, or the amplitude of motion of first sensor element 252 can be smaller than the amplitude of motion of the protective element 251 in this first motion section.

The second motion section can extend from this point (i.e., the further point mentioned above) to the protection position. In this motion section, the entire distance travelled by first sensor element 252 (i.e., its amplitude of motion) is greater than the amplitude of motion of the protective element. This results in a comparatively small change in the position of protective element 251 around the protection position being translated into a large change in the position of first sensor element 252, where the distance from second sensor element 253 changes more compared to the change in the position of protective element 251. This increases the sensitivity of the sensor for the position of protective element 251 formed by the first sensor element and the second sensor element, since the contact is dependent upon the motion of the first sensor element relative to the second sensor element and therefore the distance between them.

In one embodiment, this different amplitude of motion of first sensor element 252 and protective element 251 is achieved in that the assembly element 260 comprises a stop 255 against which sensor element 252, or an element at which first sensor element 252 is arranged, can run and relative to which first sensor element 252 can be made to rotate. As shall be described in the embodiments of FIGS. 3 and 5, a comparatively small change in the position of protective element 251 can thus be converted into a comparatively large change in the position of first sensor element 252 relative to second sensor element 253.

Figure 3:
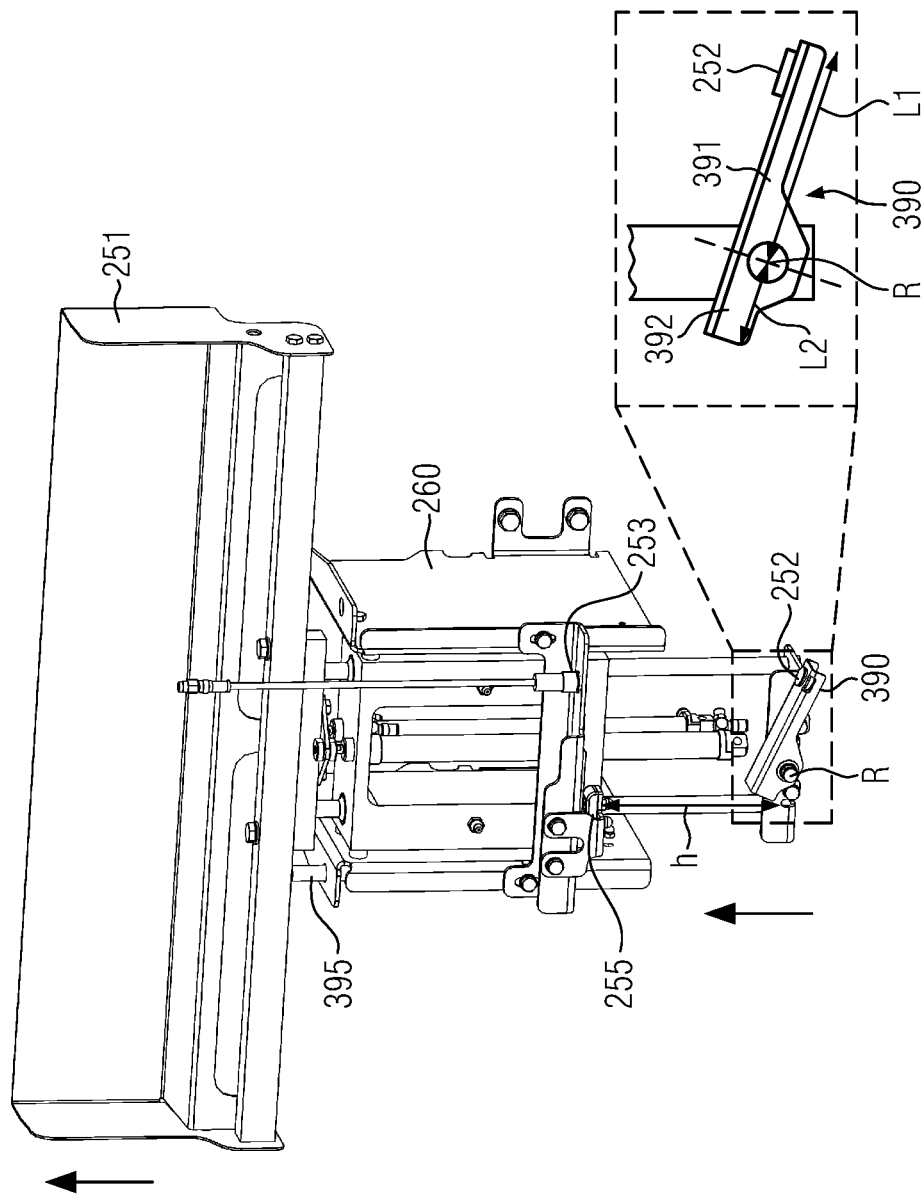
FIGS. 3 to 5 show a motion sequence of the protective element and the first sensor element according to an embodiment.
Figure 4:
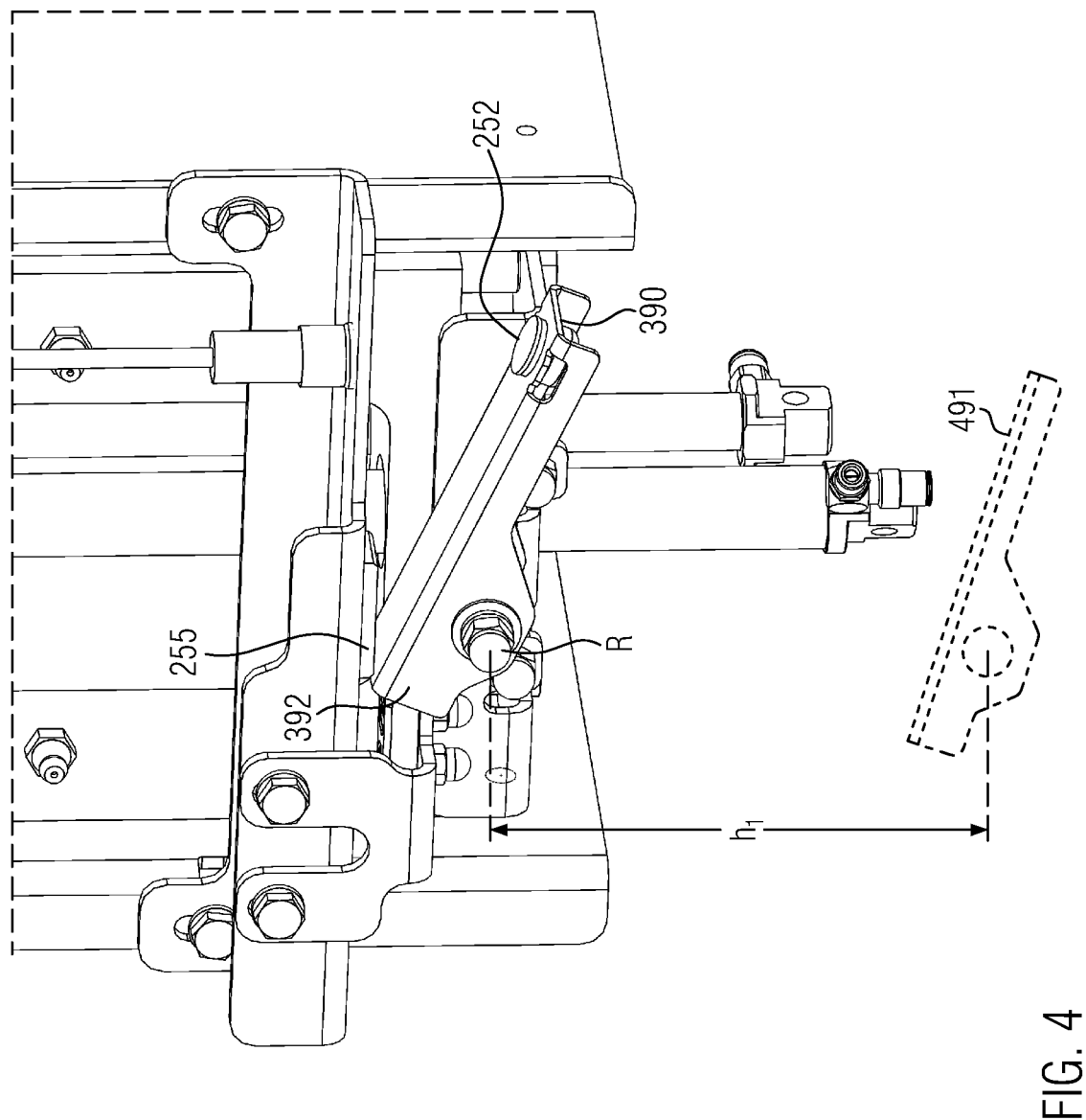
Figure 5:
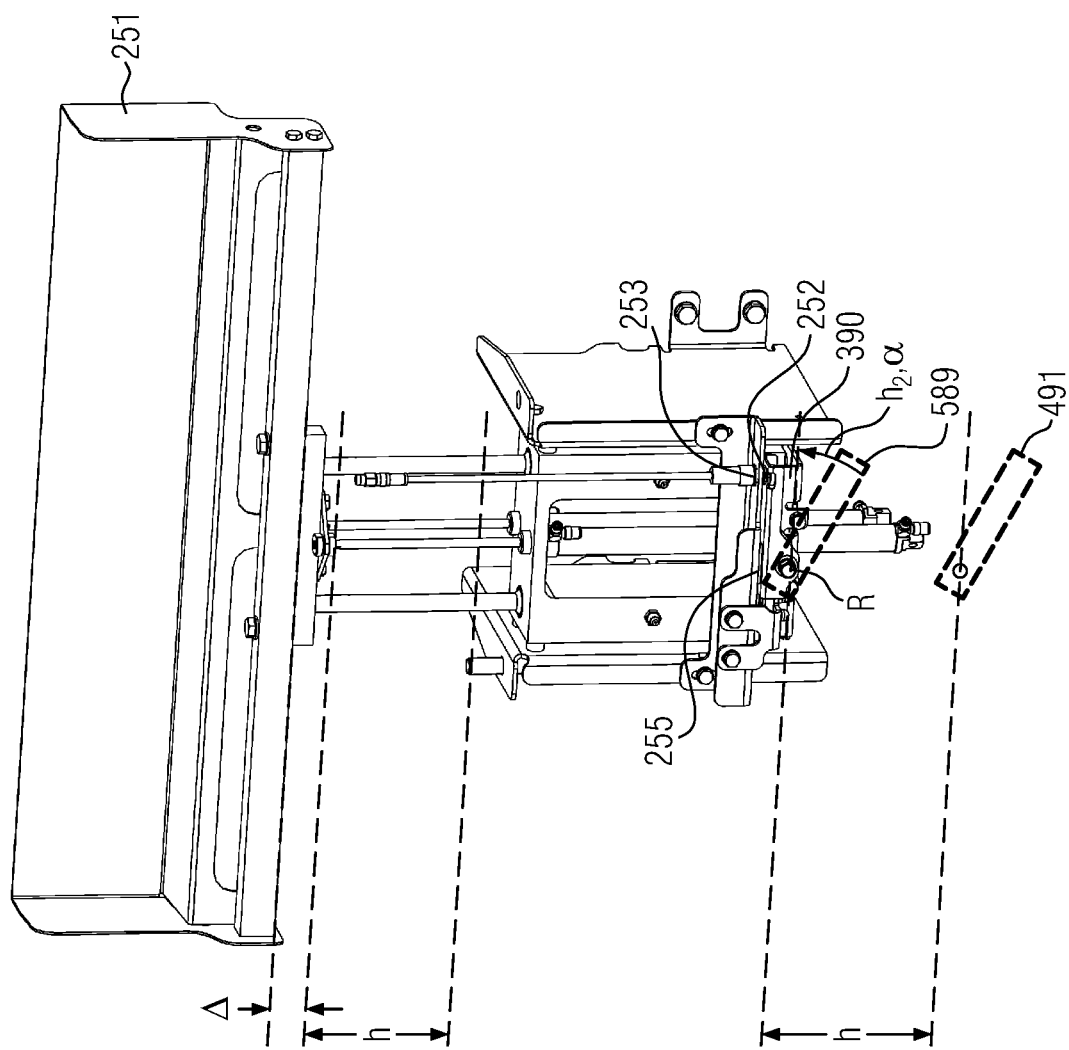

To illustrate this, FIGS. 3 to 5 show the sequence of motions when the protective element moves from the release position (FIG. 3) to the protection position (FIG. 5).

In FIG. 3, protective element 251 is in the release position. To determine the position of protective element 251 in the release position, a sensor is not absolutely necessary, since protecting the operator from injuries is substantially dependent on the fact that protective element 251 can be reliably detected in the protection position. However, it can be provided that a contact sensor 395 is arranged, for example, at assembly element 260, and comes into touching contact with protective element 251 when the protective element is positioned in the release position. This sensor can transmit a signal to control unit 280 (see FIG. 2) which thus additionally receives the information that the protective element 251 is arranged in the release position. This can be used, for example, to signal to the operator that he can reach into the working space of the machine. However, this is merely optional.

In the embodiment presently shown, first sensor element 252 is disposed at a distance h from stop 255. In the embodiment shown, first sensor element 252 is arranged at a lever which is mounted to be rotatable about an axis of rotation R. It can be seen in the enlarged schematic view in FIG. 3 that lever 390 is arranged at axis of rotation R in such a way that axis of rotation R divides the lever into a first lever arm 391 and a second lever arm 392. The first sensor element is arranged at first lever arm 391 and length L1 of first lever arm 391 is longer than length L2 of the second lever arm. It can also preferably be provided that the mass of first lever arm 391 is greater than the mass of second lever arm 392. Without further physical contact, for example, with stop 255, the torque upon the lever caused by the different masses of the lever arms causes the lever to be arranged without contact with stop 255 in the initial position presently shown. The motion of first lever arm 391 with the first sensor element 252 in a direction of rotation away from protective element 251, i.e., downwardly in the illustration in FIG. 3, can also be restricted by a stop, presently not shown. Without such a stop, the lever will move following the torque such that first lever arm 391 points vertically downwardly, as this represents the energetic minimum.

FIG. 4 illustrates a situation in which protective element 251 (presently not shown) has been moved from the release position in the direction of the protection position by height h1, which is identical to distance h from FIG. 3. During this motion, first sensor element 252 follows the position of the protective element 251 from position 491 presently shown in dashed lines, and shorter lever arm 392 comes into touching contact with stop 255 at the end of the motion from initial position 491. This motion section is selected such that lever 390, at which first sensor element 252 is arranged, has not yet experienced any rotation about axis of rotation R. Accordingly, the amplitude of motion of first sensor element 252 during this motion section is identical to the amplitude of motion of protective element 251 (both travel the distance h).

In the situation presently shown, the protective element 251 has not yet been moved to the protection position, but must still be moved further in the direction of the protection position. For example, length h1 can correspond to 90% of the entire distance traveled by the protective element 251 from the release position to the protection position.

When the protective element 251 moves further, any motion of lever arm 392 no longer occurs beyond stop 255 due to the fixed position of stop 255. Instead, the lever 390 is made to rotate about axis of rotation R, as is shown in FIG. 5.

Protective element 251 is now moved by distance $\Delta$ in the direction of the protection position, where it reaches the protection position after travelling distance $\Delta$. The protective element 251 has therefore traveled the total distance of h+$\Delta$.

As can be seen in FIG. 5, during this motion of the protective element 251 by distance $\Delta$, lever 390 is now rotated by angle $\alpha$ away from position 589 shown in dashed lines in FIG. 5. This is linked to a motion of first sensor element 252 by distance h2. If angle $\alpha$ is expressed in proportions of $2\pi$, then the amplitude of motion of first sensor element 252 corresponds to $\alpha/2\pi$ L1, where L1 is the distance of first sensor element 252 from axis of rotation R along lever 390 which, for the purpose of explanation, was equated to the length of the first lever arm 391 (see FIG. 3). The distance traveled by the shorter lever arm corresponds to distance A traveled by first protective element and can be equated in a first approximation as $\alpha/2\pi$ L2 (with L2 as the length of the lever arm 392 measured from axis of rotation R).

The ratio of the amplitude of motion of the first sensor element 252 to amplitude of motion $\Delta$ of protective element 251 is therefore approximately L1/L2, and therefore greater than 1, so that first sensor element 252 experiences a larger amplitude of motion as compared to amplitude of motion $\Delta$.

As shown in FIG. 5, at the end of this motion, the first sensor element 252 is in contact with the second sensor element 253 so that a signal that is indicative of this contact can be output.

The sensor formed by first sensor element 252 and second sensor element 253 can have a tolerance that leads to an output of a respective signal that is indicative of the contact even if this contact has not yet been established. However, due to the ratio of the amplitude of motion of the protective element and the amplitude of motion of the first sensor element, this corresponds to an even smaller motion of the protective element away from the protection position. This improves the accuracy with which the positioning of the protective element in the protection position can be determined.

Furthermore, a position of the protective element 251 slightly outside the protection position causes a comparatively large distance between the first sensor element 252 and the second sensor element 253 so that, even if the position of the protective element 251 deviates slightly from the protection position, no contact is established between the first sensor element 252 and the second sensor element 253 so that the work step of the machine can be reliably blocked by the control unit.

The accuracy or sensitivity can be increased by increasing the ratio of L1 and L2. It can be provided that length L1 of the first lever arm, at which first sensor element 252 is arranged, is at least three times as long, preferably five times as long, particularly preferably seven times as long as length L2 of the shorter lever arm. Using the example of the latter case, a deviation of the position of the protective element from the protection position of 1 mm can be translated into an approximate distance of the first sensor element from the second sensor element of 7 mm. This makes it possible to determine deviations in the position of protective element 251 from the protection position with high accuracy, thereby ensuring safe operation of the work machine.

Figure 6:
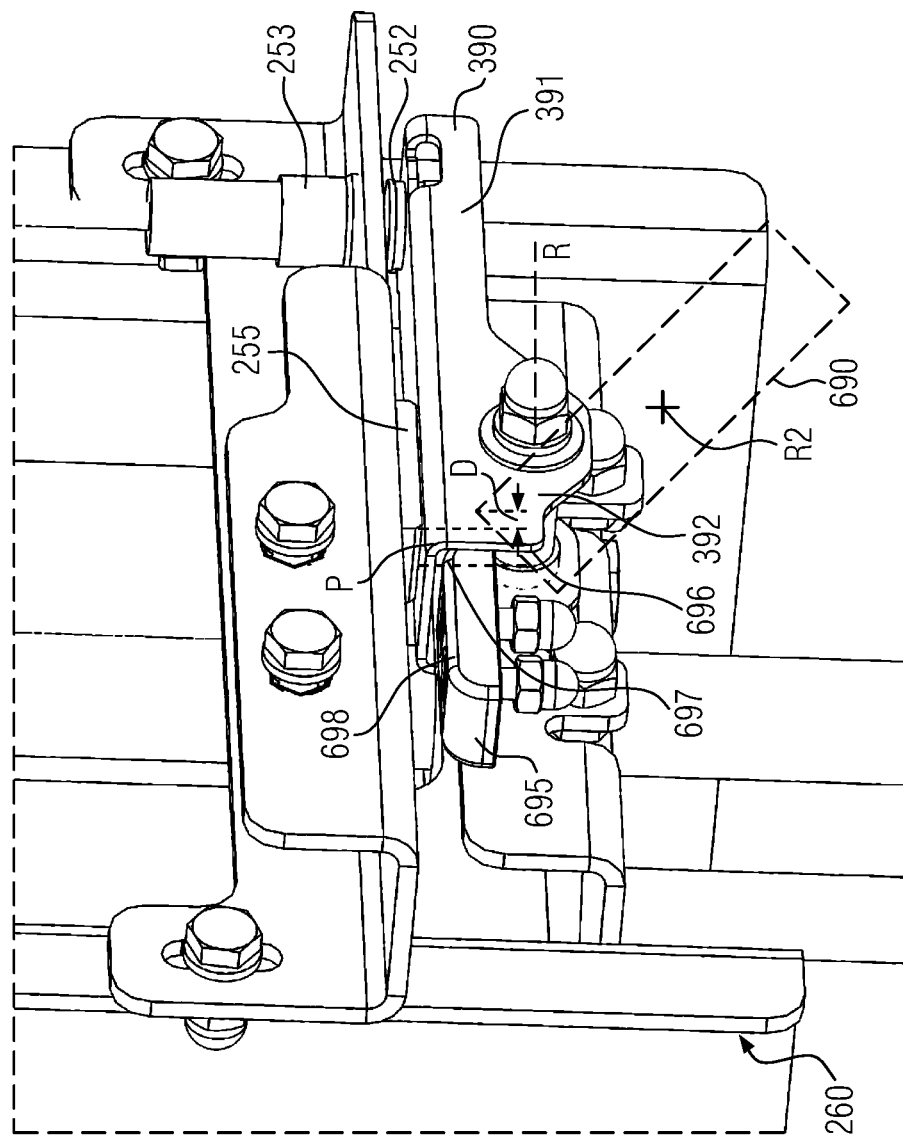
FIG. 6 shows an embodiment of a return element.

FIG. 6 shows a further embodiment in which the protective slide assembly furthermore comprises a return element 695. In this embodiment, the return element is arranged in a stationary manner relative to assembly element 260 and can in particular be firmly connected thereto (for example, by way of screw connections). Return element 695 is preferably arranged such that, with a motion of the protective element in the direction of the protection position (see FIGS. 3 to 5), lever arm 392 can be guided past the return element at a distance D in the direction of stop 255. As described with reference to FIGS. 3 to 5, when stop 255 has been reached, lever arm 392 of lever 390 is rotated about axis of rotation R and lever arm 391 is rotated in the direction of second sensor element 253 so that first sensor element 252 and second sensor element 253 can come into contact when the protective element reaches the protection position.

In this position, second lever arm 392 extends over a distance P in a direction over the return element 695, as presently shown.

When the protective slide 251 (not shown in FIG. 6) is moved from the protection position back in the direction of the release position, then this motion causes a rotation of second lever arm 392 about axis of rotation R which is caused by stationary return element 695 since second lever arm 392 in the protection position of the protective element 251 extends at least in part over return element 695. Return element 695 therefore causes first sensor element 252 to be moved away from second sensor element 253 when the protective element moves from the protection position to the release position. This embodiment ensures that lever arm 392 and therefore also first lever arm 391 and first sensor element 252 are reliably moved away from second sensor element 253 when the protective element is moved from the protection position to the release position.

It can be provided that the return element 695 comprises a support surface 698 pointing in the direction of stop 255 and/or a sloping, at least partially curved side surface 697, as seen from stop 255. Second lever arm 392 can rest on the support surface 698 when the protective element 251 is disposed in the protection position. As a result, second lever arm 392 can be positioned between stop 255, which extends above second lever arm 392, and support surface 698, which can prevent second lever arm 392 from unintentionally moving away so that contact between first sensor element 252 and second sensor element 253 is retained as long as the protective element is in the protection position.

The curved side surface 697 can advantageously ensure that second lever arm 392 can be moved away from the position that second lever arm 392 assumes when the protective element 251 is in the protection position, without canting with the return element 695, when the protective element 251 is moved from the protection position to the release position.

For this purpose, second lever arm 392 can preferably comprise a receiving region 696, delimited by the material of the second lever arm in the direction of stop 255, in which the return element 695 can engage with a rotation of second lever arm 392.

In addition to releasing and blocking a work step of the work machine based on the position of the protective slide, the work machine can further comprise a film detection mechanism which is arranged, for example, in the work space and/or in the feed opening and/or the discharge opening and configured to detect the presence and/or absence of packaging material at least in the work space. Regardless of the position of the protective slide, it can be provided that the work step or a function of the work machine is blocked also when it is determined by the film detection mechanism that there is no packaging material present in the work space.

What is claimed is:

1. A protective slide assembly for a work machine for processing packaging material, the protective slide assembly comprising an assembly element for connecting the protective slide assembly to the work machine, a protective element arranged to be movable relative to the assembly element, a first sensor element, and a second sensor element fixedly arranged at the assembly element, wherein the protective element is movable relative to the assembly element between a release position and a protection position and wherein the first sensor element and the second sensor element are configured to come into contact in the protection position of the protective element and to output a signal that is indicative of the contact, wherein the first sensor element is arranged such that the first sensor element is movable along with the protective element and an amplitude of motion of the first sensor element is greater than an amplitude of motion of the protective element.

2. The protective slide assembly according to claim 1, wherein the first sensor element and the second sensor element together form a magnetic circuit.

3. The protective slide assembly according to claim 2, wherein one of the first and second sensor elements comprises an actuatable magnetic switch, and the other of the first and second sensor elements comprises a magnet for actuating the magnetic switch.

4. The protective slide assembly according to claim 1, wherein the amplitude of motion of the first sensor element and the amplitude of motion of the protective element each comprise a first amplitude portion in a first motion section that comprises the release position and a second amplitude portion in a second motion section that comprises the protection position, wherein the first amplitude portion of the first sensor element is smaller than or equal to the first amplitude portion of the protective element in the first motion section, and wherein the second amplitude portion of the first sensor element is greater than the second amplitude portion of the protective element in the second motion section.

5. The protective slide assembly according to claim 1, wherein the first sensor element is arranged at a lever which is mounted to be rotatable about an axis, wherein the axis divides the lever into a first lever arm and a second lever arm, wherein the second lever arm is shorter than the first lever arm and the first sensor element is arranged at the first lever arm, wherein the protective slide assembly comprises a stop against which the second lever arm can abut when the protective element moves in a direction of the protection position so that, with a rotation of the lever about the axis, the first sensor element can be moved in a direction of the second sensor element.

6. The protective slide assembly according to claim 5, wherein the first lever arm has a greater mass than the second lever arm.

7. The protective slide assembly according to claim 1, further comprising a return element which is arranged such that the return element moves the first sensor element away from the second sensor element when the protective element moves from the protection position to the release position.

8. The protective slide assembly according to claim 1, wherein the protective element and the amplitude of motion of the protective element define a region, and the assembly element, the first sensor element, and the second sensor element are arranged outside the region.

9. A work machine for processing packaging material, the work machine comprising a feed opening for feeding the packaging material, a work space for processing the packaging material, a discharge opening for discharging the processed packaging material from the work space, and the protective slide assembly according to claim 1 in a region of the feed opening or in a region of the discharge opening, wherein the protective slide assembly is arranged such that the protective element in the protection position blocks an operator from reaching into the feed opening or the discharge opening.

10. The work machine according to claim 9, wherein the protective element in the protection position enables packaging material to be transported into the feed opening or processed packaging material to be transported out of the discharge opening.

11. The work machine according to claim 9, wherein the work machine comprises a sealing station, a deep-drawing machine, a loading machine, an inspection device, and/or a disinfection device.

12. A method for processing packaging material with a work machine, wherein the work machine comprises a feed opening for feeding packaging material, a work space, a discharge opening for discharging processed packaging material from the work space, and a protective slide assembly, wherein the protective slide assembly is connected to the work machine by way of an assembly element of the protective slide assembly and comprises a protective element arranged to be movable relative to the assembly element, a first sensor element, and a second sensor element fixedly arranged at the assembly element, wherein the method comprises:

moving the protective element relative to the assembly element between a release position and a protection position, wherein the first sensor element and the second sensor element come into contact in the protection position of the protective element and output a signal that is indicative of the contact, wherein the first sensor element is arranged such that the first sensor element is moved along with the protective element and an amplitude of motion of the first sensor element is greater than an amplitude of motion of the protective element; and releasing a work step of the work machine by a control unit of the work machine based on receiving the signal that is indicative of the contact.

13. The method according to claim 12, wherein the amplitude of motion of the first sensor element and the amplitude of motion of the protective element each comprise a first amplitude portion in a first motion section that comprises the release position and a second amplitude portion in a second motion section that comprises the protection position, wherein the first amplitude portion of the first sensor element is smaller than or equal to the first amplitude portion of the protective element in the first motion section, and wherein the second amplitude portion of the first sensor element is greater than the second amplitude portion of the protective element in the second motion section.

14. The method according to claim 12, wherein the first sensor element is arranged at a lever which is mounted to be rotatable about an axis, wherein the axis divides the lever into a first lever arm and a second lever arm, wherein the second lever arm is shorter than the first lever arm and the first sensor element is arranged at the first lever arm, wherein the protective slide assembly comprises a stop against which the second lever arm can abut when the protective element moves in a direction of the protection position so that, with a rotation of the lever about the axis, the first sensor element is moved in a direction of the second sensor element.

15. The method according to claim 14, wherein the first lever arm has a greater mass than the second lever arm.

16. The method according to claim 12, wherein the protective slide assembly comprises a return element and wherein the first sensor element is moved away from the second sensor element by the return element when the protective element moves from the protection position to the release position.

17. The method according to claim 12, wherein the protective element and the amplitude of motion of the protective element define a region, and the assembly element, the first sensor element, and the second sensor element are arranged outside the region.

18. The method according to claim 12, wherein the first sensor element and the second sensor element together form a magnetic circuit.

19. The method according to claim 18, wherein one of the first and second sensor elements comprises an actuatable magnetic switch, and the other of the first and second sensor elements comprises a magnet for actuating the magnetic switch.

* * * * *